United States Patent

[11] 3,631,524

| [72] | Inventor | Helmut Denner, deceased<br>late of Gebenstorf, Switzerland by Leo<br>Wyrsch, administrator, Baden, Switzerland |
|---|---|---|
| [21] | Appl. No. | 885,488 |
| [22] | Filed | Dec. 16, 1969 |
| [45] | Patented | Dec. 28, 1971 |
| [73] | Assignee | Aktiengesellschaft Brown, Boveri & Cie<br>Baden, Switzerland |
| [32] | Priority | Jan. 15, 1969 |
| [33] | | Switzerland |
| [31] | | 471/69 |

[54] ARRANGEMENT FOR INCREASING THE TRANSFER OF ELECTRICAL POWER IN THE WELDING OF PIPES BY INDUCED CURRENTS
6 Claims, 1 Drawing Fig.

[52] U.S. Cl. .................................................. 219/9.5,
219/10.41, 219/10.79
[51] Int. Cl. .................................................. B23k 13/00
[50] Field of Search ................................ 219/8.5,
9.5, 10.79, 10.41

[56] References Cited
UNITED STATES PATENTS
2,788,426  4/1957  Thompson..................... 219/10.79 X
2,794,893  6/1957  Crawford ......................  219/8.5
2,827,544  3/1958  Cable et al....................  219/8.5 X

*Primary Examiner*—J. V. Truhe
*Assistant Examiner*—Hugh D. Jaeger
*Attorney*—Pierce, Scheffler & Parker ABSTRACT: A procedure for welding together the adjacent longitudinal edges of a split tube in a longitudinally progressive manner by induced high-frequency currents flowing to the welding point includes a primary induction turn surrounding the tube and located upstream from the weld point for inducing current flows in the tube to and from the weld point. In addition to the primary induction turn, a secondary turn encircles the tube in the annular space between the tube and primary turn, and the spacing between the primary and secondary turns as measured in a radial direction is smaller than the spacing between the secondary turn and the tube. Current induced in the secondary turn is applied to the tube conductively by two sets of contacts, each contact set being disposed adjacent a respective opposed face of the split tube to produce current flows along the opposed faces which reinforce the current flows induced along these same paths by the primary induction turn. The contact sets also produce additional current flows around the back of the tube which act in opposition to and therefore reduce similar current flows induced along these same paths by the primary induction turn.

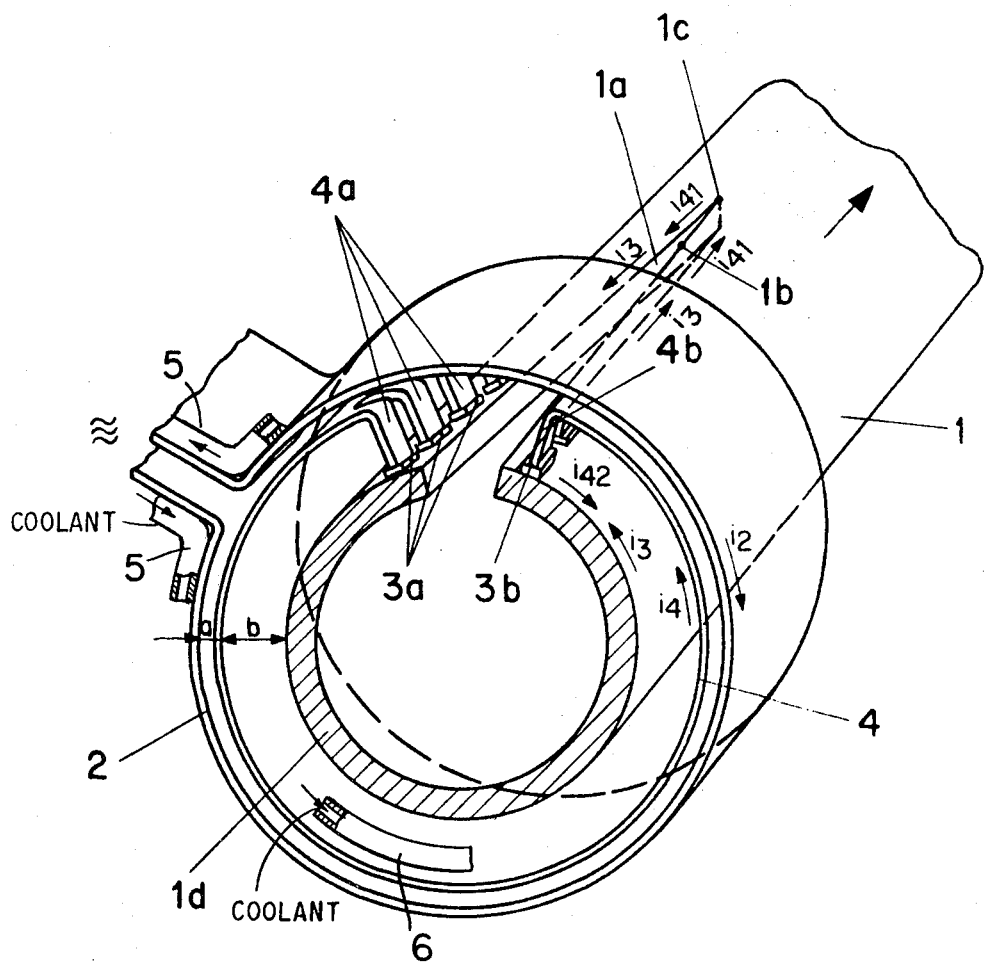

ARRANGEMENT FOR INCREASING THE TRANSFER OF ELECTRICAL POWER IN THE WELDING OF PIPES BY INDUCED CURRENTS

This invention relates to welding and is more specifically concerned with a technique known nowadays as high-frequency welding.

In high-frequency welding use is made of the tendency for a relatively high frequency alternating current to concentrate itself in the superficial layer of a metal conductor. During welding of two metal parts it is the superficial layers of those parts which are required to fuse intimately in order to form a good weld. By using high-frequency currents to bring the opposed faces of the parts to a softened or plastic condition, the underlying metal remains relatively cool and thus firm. This allows the softened metal faces to be forced together by way of the firm underlying metal, while the expenditure of power wastefully used to raise the temperature of metal portions which are not to be welded together is reduced. Finally, relatively high welding speeds can be attained by using high-frequency welding.

High-frequency welding lends itself to pipe manufacture. One of many different methods of manufacturing a pipe by this technique is to advance a metal strip in the direction of its length while forming it into a longitudinally split tube. The opposed longitudinal marginal edges of tube which are to be welded together are so guided that they follow convergent paths which meet at a weld point at which the opposed softened edges of the strip are crushed together to form the weld. The convergent paths result in a V-shaped gap being formed in advance of the weld point and having its apex at the weld point. The high frequency currents are applied to the metal strip in advance of the weld point so that they follow a circuit which includes the converging opposed edges of the strip which are to be welded together. As the edges approach one another there is a progressively increasing tendency for the high-frequency currents to concentrate on their opposed faces by mutual attraction of the current flows in opposite directions occurring on opposite sides of the V-shaped gap. Thus the edge faces attain welding temperature by the time they reach the weld point where the current passes between the two conducting faces and thus through the weld.

The high-frequency currents may be applied to the strip either inductively or by contacts. In the former case use is normally made of a primary turn which encircles the longitudinally split tube in advance of the weld point. The tube acts as a secondary winding of a transformer and the induced currents in it flow around the back of the tube located beneath the turn and then along the opposed edges of the tube to and from the weld point. In the case of conductively applied currents the current flow is substantially confined to the marginal edge portions of the longitudinally split tube as they approach one another along opposite sides of the V-shaped gap. An inductive core or impeder is sometimes used inside the tube to diminish the high-frequency current penetration of the metal and thus the power loss caused by unwanted heating effects.

An object of this invention is the provision of an improved apparatus and method for high frequency welding of a longitudinally split metal tube.

In accordance with one aspect of this invention pipe welding apparatus includes a primary induction turn substantially coaxially arranged a secondary induction turn which terminates at its circumferential ends in inwardly directed contacts having their contact faces spaced from the secondary turn by a distance substantially greater than the radial distance separating the secondary turn from the primary turn.

In accordance with a second aspect of this invention a method of welding a pipe comprises advancing a longitudinally split tube towards a weld point at which a high-frequency weld current passes between opposed contacting faces of the tube, inducing in the tube from a primary induction turn upstream of the weld point flows of high-frequency currents which follow a path around the back of the tube and to and from the weld point via the opposed tube faces which are to be welded together, inducing inductively a secondary high-frequency current in a secondary turn encircling the tube inside the primary turn and spaced radially further from the tube than from the primary turn, and applying the secondary current from the secondary turn to the tube by way of two sets of contacts of which each set is disposed adjacent a respective opposed face of the tube to produce current flows along the opposed faces reinforcing the current flows induced by the primary induction turn, the contacts also producing further current flows around the back of the tube which act in opposition to, and therefore reduce, the current flows induced in the back of the tube by the primary turn.

The invention results in the advantage that a relatively larger part of the high-frequency power supplied for welding is actually used for heating the opposed edge faces than is possible if the high-frequency current is applied solely by induction.

The contacts which apply the secondary current to the longitudinally split tube in advance of the weld point are preferably formed by sets of aligned fingers formed by slotting the end portions of the secondary turn and bending them inwardly so that they rest on the outer surface of the marginal edge portions of the tube in advance of the weld point.

The invention will now be described in more detail, by way of example, with reference to the accompanying partly diagrammatic drawing which is a perspective view of part of a pipe welding apparatus.

In the FIGURE a pipe 1 is fabricated by longitudinally seam welding at a weld point 1c a longitudinally split tube formed from a sheet metal strip which is advanced in the direction of the arrow. As the strip is advanced it is formed into a longitudinally split tube having opposed edges which are guided along respective sides of a V-shaped gap having its apex at the weld point 1c. The edges have opposed faces 1a, 1b which are crushed together at the weld point by rolls which are not shown.

Disposed in advance of the weld point is a single primary induction turn 2 in the form of a flat band which is energized by a high-frequency welding current from a suitable generator not shown. The turn 2 is cylindrical and is coaxially arranged with respect to the pipe 1. The wider portion of the V-shaped gap is located beneath the turn 2. As is known per se, current $i_2$ flowing through the turn 2 induces currents $i_3$ which flow around the back of the tube beneath the turn 2 and then to and from the weld point 1c along the opposed converging edge faces 1a, 1b. As these edge faces approach one another the welding current is concentrated progressively more and more on the surface layers of the faces which are thereby brought to a welding temperature by the time they reach the weld point 1c. Such current flows are shown by the arrows $i_3$ in the drawing.

In the annular space between the primary turn 2 and the longitudinally split tube is coaxially arranged a secondary turn 4. It is spaced radially from the primary turn 2 by a distance $a$ which, in practice, is made as small as is practical and is substantially smaller than the radial spacing $b$ between the secondary turn 4 and the outer surface of the longitudinally split tube. The circumferential end-portions of the secondary turn 4 are longitudinally slotted to provide at each end a set of parallel spaced fingers 4a which are turned inwardly toward the tube and terminate in resilient contacts 3a, 3b. These contacts serve as brushes which press resiliently on the marginal edge portions of the longitudinally split tube adjacent the edge faces 1a and 1b as shown.

During operation of the welding apparatus the primary induction turn 2 induces currents in the secondary induction turn 4 in addition to the currents $i_3$ in the tube. The secondary turn current $i_4$ flows in the opposite direction to the primary turn current $i_2$ and when applied to the longitudinally split tube it flows between the sets of contacts 3a, 3b by way of two electrically parallel paths which carry respective currents $i_{41}$ and $i_{42}$.

The secondary current portion $i_{42}$ flows to and from the weld point $1c$ by way of the converging edge faces $1a$ and $1b$. The currents $i_3$ and $i_{41}$ are in phase with one another so that their heating effect is aggregated. In this way the power usefully employed is enhanced.

The current portion $i_{42}$ flowing along the electrically parallel path travels circumferentially around the back $1d$ of the tube and, as shown by the arrows, is in antiphase with the current $i_3$ induced by the primary winding 2. In consequence, the magnitude of the current flowing around the back of the tube and producing wasted heating is reduced.

The greater the diameter of the secondary turn 4, the higher is the voltage induced in it. Although there have been proposals to provide a shunt of low conductivity across the open end of the V-shaped gap in order to reduce heat losses around the back of the tube, the shunt is normally placed close to the tube so that it cannot be considered as a secondary turn and it does not provide currents to the weld point which supplement that provided by the primary induction turn.

To improve the power transfer to the weld point, a magnetizable core or impeder is advantageously placed within the interior of the pipe in the region of the turns. It is not shown in the drawing.

The above described apparatus has the advantage that for a given size of high-frequency power unit more useful power is available for welding. By using a series of contacts $3a$, $3b$ connected in parallel at each end of the secondary turn 4, the current load transferred between each contact and the tube is reduced. Lesser contact pressures are therefore necessary so that the contact wear is reduced. Preferably at least three contacts are used in each set or series and satisfactory results are obtained with up to 30 or more contacts.

As shown, the turns are preferably relatively long cylinders whose length is approximately equal to their diameter. The primary and secondary turns 2 and 4 may be water cooled respectively by cooling tubes 5 and 6 located in heat exchange surface contact with the turns, the water coolant being circulated through the tubes, and the contacts are also preferably water cooled. Contact loads of approximately 10 to 40 amps are achieved with cylindrical turns whose actual length is approximately equal to their diameter, together with good electrical contact with the the tube at negligible heating at the contacts.

It is claimed:

1. Apparatus for welding together the adjacent longitudinally extending edge faces of a split tube in a longitudinally progressive manner by induced high-frequency currents flowing to the weld point, said apparatus comprising a primary induction turn surrounding the tube and located upstream from the weld point for inducing current flows in the tube along said edge faces to and from the weld point, a secondary induction turn encircling the tube in the annular space between the tube and said primary turn and being inductively coupled to said primary, the spacing between said primary and secondary induction turns as measured in a radial direction being smaller than the spacing between said secondary turn and tube, and the current flow induced in said secondary turn being applied to said tube by two sets of contact means each of which is disposed adjacent a respective edge face of the tube thereby to establish a current flow from one contact set along one edge face to the weld point and a current flow from the weld point along the other edge face to the other contact set, the current flow along the edge faces of the tube derived from said secondary turn being in the same direction as and hence reinforcing the current flow along the edge faces of the tube derived from said primary turn.

2. Welding apparatus as defined in claim 1 wherein said two sets of contact means comprising radially inward directed sets of contact fingers at circumferentially spaced ends of said secondary turn.

3. Welding apparatus as defined in claim 1 wherein said primary and secondary induction turns have a cylindrical configuration, the diameter of each such turn being substantially equal to its length.

4. Welding apparatus as defined in claim 1 wherein means are provided for fluid cooling of said primary and secondary turns.

5. Apparatus for welding a longitudinal joint along the edge faces of a split tube to form a pipe which comprises a primary induction turn substantially coaxially arranged around a secondary induction turn which is inductively coupled to said primary and which terminates at its circumferential ends in radially inward directed contact fingers having contact faces adapted to engage respectively the opposed edges of the tube, said contact faces being spaced radially from said secondary turn by a distance substantially greater than the radial distance separating said secondary turn from said primary turn.

6. A method of welding a pipe which comprises the steps of advancing a longitudinally split tube towards a weld point at which a high frequency weld current passes between opposed contacting faces of the tube, inducing in the tube from a primary induction turn upstream of the weld point flows of high-frequency currents which follow a path around the back of the tube and to and from the weld point via the opposed tube faces which are to be welded together, inducing inductively a secondary high-frequency current in a secondary turn inductively coupled to said primary and encircling the tube inside the primary turn and spaced radially further from the tube than from the primary turn, and applying the secondary current from the secondary turn to the tube by way of two sets of contacts of which each set is disposed adjacent a respective opposed face of the tube to produce current flows along the opposed faces reinforcing the current flows induced by the primary induction turn, the contacts also producing further current flows around the back of the tube which act in opposition to, and therefore reduce, the current flows induced in the back of the tube by the primary turn.

* * * * *